United States Patent Office 3,546,183
Patented Dec. 8, 1970

3,546,183
ELASTOMER POLYMERS DERIVED FROM BICYCLO 2.2.1 HEPTENE-2
Jean Vergne, Leon Solaux, Jean-Claude Robinet, and Philippe Lacroix, Verneuil-en-Halatte, France, assignors to Charbonnages de France, Paris, France, a public institution of France
No Drawing. Filed Aug. 12, 1968, Ser. No. 751,763
Claims priority, application France, Aug. 18, 1967, 118,349
Int. Cl. C08f 1/72, 5/00, 17/00
U.S. Cl. 260—78.4                                8 Claims

ABSTRACT OF THE DISCLOSURE

New elastomer homopolymers and copolymers having in their structural formula units of alkyl-5 bicyclo [2.2.1] heptene-2 or alkoxy-5 bicyclo [2.2.1] heptene-2.

---

The present invention relates to new elastomer polymers of the series of bicyclo [2.2.1] heptene-2 constituted by units having the formula:

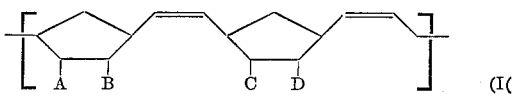

(I( in which A represents H, B is selected from the group comprising the alkyl radicals with straight chain and with branched chain having 2 to 14 atoms of carbon in the main chain, the alkoxy radicals with straight chain and with branched chain comprising from 2 to 14 atoms of carbon in the main chain, C is selected from the group comprising H, CH$_3$, CO$_2$R (where R is selected from the group comprising the alkyl and oxy-alkyl radicals having from 2 to 14 atoms of carbon in the main chain, the said main chain being selected from the group comprising straight chains and branched chains, excluding the chains having a branch in alpha with respect to the carboxyl carbon), D is selected from the group comprising H, CO$_2$R as defined above, the alkyl radicals with straight chain and branched chain having 2 to 14 atoms of carbon in the main chain, the alkoxy radicals with straight chain and branched chain having 2 to 14 atoms of carbon in the main chain, provided that when D is selected from the group comprising the alkyl and alkoxy radicals having the above meaning, C represents hydrogen.

The invention relates more particularly to polymers of alkyl-5 bicyclo [2.2.1] heptene-2 and alkoxy-5 bicyclo [2.2.1] heptene-2. It preferably relates to the polymers of these hydrocarbons having a glass transition temperature less than −10° C. and obtained by opening the cycle containing the double bond.

Polymers of bicyclo [2.2.1] heptene-2 and methyl-5 bicyclo [2.2.1] heptene-2 are already known as obtained by opening the cycle containing the double bond of the corresponding monomers (see Michelotti et al., Journal of Polymer Sciene, "Co-ordinated Polymerization of the Bicyclo [2.2.1] Heptene-2 Ring System (Norbornene) in Polar Media," vol. 3 (1965), pp. 895 to 905). These polymers are obtained in the form of solids having relatively-high glass transition temperature and their direct use in the field of elastomers can hardly be contemplated.

The applicants have found that upon polymerization of alkyl-5 bicyclo [2.2.1] heptene-2 or alkoxy-5 bicyclo [2.2.1] heptene-2, the substituting alkyl or alkoxy radical of which contains at least 2 atoms of carbon, the polymerization taking place by initiating by means of halides of noble metals such as ruthenium chloride, in the presence of a reducing agent such as an alcohol, there are obtained polymers which have lower glass transition temperatures. The glass transition temperature thus obtained decreases uniformly with the increase of the number of atoms of the alkyl or alkoxy lateral chain. Thus, in the case of the alkyl-5 bicyclo [2.2.1] heptene-2 in which the alkyl radical is linear, polymers are obtained from pentyl-5 bicyclo [2.2.1] heptene-2 which can be employed as they stand in the field of elastomers, whereas the propyl-5 bicyclo [2.2.1] heptene-2 and butyl-5 bicyclo [2.2.1] heptene-2 can only be used as bases for elastomer compositions.

However, in the case of the n-alkyl-5 bicyclo [2.2.1] heptene-2, when the number of carbon atoms of the alkyl radical is high (greater than 10), polymers are obtained which have melting temperatures covering the glass transition temperatures. Thus, the polymers of dodecyl-5 bicyclo [2.2.1] heptene-2 and tetradecyl-5 bicyclo [2.2.1] heptene-2 will be less advantageous for use in the field of elastomers.

It is possible to utilize polymers of alkyl-5 bicyclo [2.2.1] heptene-2 or of alkoxy-5 bicyclo [2.2.1] heptene-2 which are more or less branched. However, when the branch is located close to the cycle or on the cycle itself as is the case for gem-dimethyl-5 bicyclo [2.2.1] heptene-2, the glass transition temperature of the polymer is definitely higher than that of the polymer of the n-alkyl-5 bicyclo [2.2.1] heptene-2 or of the n-alkoxy-5 bicyclo [2.2.1] heptene-2. These polymers are less advantageous for use in the field of elastomers.

Finally, the invention relates to the co-polymers of the hydrocarbons and these ethers between each other and with other polymerizable compounds under the same conditions, in particular with bicyclo [2.2.1] heptene-2, methyl-5 bicyclo [2.2.1] heptene-2, the esters of bicyclo [2.2.1] heptene-2 carboxylic-5 acid and the diesters of bicyclo [2.2.1] heptene-2 dicarboxylic-5,6 acid.

The hydrocarbons which serve as raw materials for the polymers of the present invention may be obtained by condensation of cyclopentadiene with an olefin hydrocarbon in which the double bond is terminal (see Annalen der Chemie, "Carbonäure-syntheses in der bicycloheptan und tricyclodecan-Reihe," Kech (H) Haaf (W) 638 (1960), pp. 111–121). The ethers may be prepared in the same manner from alkyl vinyl ethers.

The examples which follow, given by way of illustration and not in any limitative sense, will make the scope and the advantage of the invention more clearly understood.

The following Examples 1 to 10 are concerned with the homopolymers of alkyl-5 bicyclo [2.2.1] heptene-2.

EXAMPLE 1

There are introduced into an ampulla 0.34 gram of propyl-5 bicyclo [2.2.1] heptene-2, 3 ml. of butanol and 1.3 mg. of hydrated ruthenium chloride. After having degasified this ampulla under vacuum by successive melting and freezing, the ampulla is sealed and placed in a thermo-controlled bath at 100° C. for 12 hours. After polymerization, the ampulla is broken and the polymer is washed with methanol by means of a turbo-grinder and dried.

According to thermal differential analysis carried out on the Du Pont 900 apparatus, 0.34 gram of amorphous polymer is obtained. The glass transition temperature of the polymer is +10° C. Its infra-red spectrum shows that the polymerization is effected by opening the cycle.

EXAMPLE 2

The operation is effected as in Example 1, with 0.37 gram of butyl-5 bicyclo [2.2.1] heptene-2. After 12 hours at 100° C., there is obtained 0.36 gram of amorphous polymer having a glass transition temperature of +9° C.

EXAMPLE 3

The operation is carried out as in Example 1, with 0.41 gram of pentyl-5 bicyclo [2.2.1] heptene-2. In 15½ hours at 100° C., there is obtained 0.41 gram of amorphous polymer having a glass transition temperature of −12° C.

EXAMPLE 4

The operation is effected as in Example 1, with 1.79 grams of hexyl-5 bicyclo [2.2.1] heptene-2. In three hours at 90° C., there are obtained 1.75 grams of amorphous polymer having a glass transition temperature of −17° C.

EXAMPLE 5

The operation is the same as for Example 1, with 2.06 grams of octyl-5 bicyclo [2.2.1] heptene-2. In three hours at 90° C., there are obtained 1.77 grams of amorphous polymer, having a glass transition temperature of −38° C.

EXAMPLE 6

The operation is carried out as in Example 1, with 0.58 gram of decyl-5 bicyclo [2.2.1] heptene-2. In 21½ hours at 110° C., there is obtained 0.26 grams of polymer.

Differential heat analysis first indicates a melting point of −48° C. This phenomenon of melting after recycling becomes transformed to a glass transition phenomenon, and after re-cycling three times, there is observed a glass transition temperature of −51° C.

EXAMPLE 7

The operation is carried out as in Example 1, with 0.65 gram of dodecyl-5 bicyclo [2.2.1] heptene-2. After three hours at 110° C., there is obtained 0.20 gram of polymer which, by differential heat analysis, shows a melting point of −15° C.

EXAMPLE 8

The operation is the same as in Example 1, with 0.72 gram of tetradecyl-5 bicyclo [2.2.1] heptene-2. In 16 hours at 110° C., there is obtained 0.27 grams of polymer which, by differential heat analysis, shows a melting point of +10° C.

EXAMPLE 9

The operation is again the same as in Example 1, with 0.49 gram of gem-dimethyl-5 bicyclo [2.2.1] heptene-2. In 16 hours at 110° C., there is obtained 0.48 gram of polymer, the glass transition temperature of which is +74° C.

EXAMPLE 10

The operation is the same as for Example 1, with 0.375 gram of isobutyl-5 bicyclo [2.2.1] heptene-2. In 20 hours at 100° C., there is obtained 0.34 gram of polymer having a glass transition temperature of +40° C.

The following examples 11 to 13 relate to the homopolymers of alkoxy-5 bicyclo [2.2.1] heptene-2.

EXAMPLE 11

There are introduced into an ampulla 8.4 grams of butoxy-5 bicyclo [2.2.1] heptene-2, 12.5 ml. of butanol and 66 mg. of ruthenium chloride. After having been degasified under vacuum by successive melting and freezing, this ampulla is sealed and placed in a heat-controlled bath at 70° C. for 24 hours. After polymerization, the ampulla is broken and the polymer is washed with methanol by means of a turbo-grinder, and dried.

There are obtained 1.2 grams of amorphous polymer, according to differential heat analysis carried out on the Du Pont 900 apparatus. The glass transition temperature of the polymer is −9° C. Its infra-red spectrum shows that the polymerization is effected by opening the cycle.

EXAMPLE 12

The operation is carried out as in Example 10, with 8.4 grams of isobutoxy-5 bicyclo [2.2.1] heptene-2. There is obtained 0.4 gram of polymer having a glass transition temperature of +30° C.

EXAMPLE 13

The operation is carried out as in Example 10, with 10.6 grams of iso-octyloxy-5 bicyclo [2.2.1] heptene-2. There is obtained 0.2 gram of polymer having a glass transition temperature of +38° C.

The following Examples 14 to 16 concern the copolymers of alkyl-5 bicyclo [2.2.1] heptene-2.

EXAMPLE 14

The operation is carried out as for Example 1, with 0.515 gram of octyl-5 bicyclo [2.2.1] heptene-2 and 0.655 gram of dodecyl-5 bicyclo [2.2.1] heptene-2. After 12 hours at 100° C. there is obtained 0.310 gram of copolymer, having a glass transition temperature of −50° C.

EXAMPLE 15

The operation is carried out as in Example 14, with 0.655 gram of dodecyl-5 bicyclo [2.2.1] heptene-2 and 0.725 gram of tetradecyl-5 bicyclo [2.2.1] heptene-2. In 15 hours at 100° C. there is obtained 0.140 gram of copolymer having two melting temperatures of −15° C. and −6° C.

EXAMPLE 16

The operation is the same as in Example 13, with 0.585 gram of decyl-5 bicyclo [2.2.1] heptene-2 and 0.725 gram of tetradecyl-5 bicyclo [2.2.1] heptene.2. In 15 hours at 100° C. there is obtained 0.230 gram of copolymer having a melting temperature of −17° C.

The following Examples 17 to 19 relate to the copolymers of an alkyl-5 bicyclo [2.2.1] heptene-2 with bicyclo [2.2.1] heptene-2.

EXAMPLE 17

The operation is the same as for Example 1, with 0.82 gram of pentyl-5 bicyclo [2.2.1] heptene-2 and 1.41 gram of bicyclo [2.2.1] heptene-2. In 15 hours at 100° C. there are obtained 2.05 grams of copolymer having a glass transition temperature of +15° C. and containing 54% by mols of bicyclo [2.2.1] heptene-2.

EXAMPLE 18

The operation is the same as for Example 17, with 1.64 grams of pentyl-5 bicyclo [2.2.1] heptene-2 and 0.94 gram of bicyclo [2.2.1] heptene-2. In 15 hours at 100° C., there are obtained 2.06 grams of copolymer having a glass transition temperature of +15° C. and containing 30% by mols of bicyclo [2.2.1] heptene-2.

EXAMPLE 19

The operation is the same as for Example 17, with 2.46 grams of pentyl-5 bicyclo [2.2.1] heptene-2 and 0.47 gram of bicyclo [2.2.1] heptene-2. In 15 hours at 100° C., there are obtained 2.74 grams of copolymer containing 16% by mols of bicyclo [2.2.1] heptene-2.

The following Examples 20 to 22 relate to the copolymers of an alkyl-5 bicyclo [2.2.1] heptene-2 with a diester of bicyclo [2.2.1] heptene-2 dicarboxylic-5,6 acid.

EXAMPLE 20

The operation is carried out as in Example 1, with 0.205 gram of pentyl-5 bicyclo [2.2.1] heptene-2 and 1.395 grams of diester of butyl ether of the triethylene-glycol of the exo cis bicyclo [2.2.1] heptene-2 dicarboxylic-5,6 acid in solution in 2.5 ml. of toluene with 3 mg. of ruthenium chloride in 0.5 ml. of butanol. In 24 hours at 90° C., there is obtained 0.941 gram of copolymer with a glass transition temperature of −75° C.

EXAMPLE 21

The operation is carried out as for Example 20, with 0.410 gram of pentyl-5 bicyclo [2.2.1] heptene-2 and 1.395 grams of diester of butyl ether of triethylene-glycol of the exo cis bicyclo [2.2.1] heptene-2 dicarboxylic-5,6 acid in solution in 2.5 ml. of toluene with 3 mg. of ruthenium chloride in 0.5 ml. of butanol. In 24 hours at 90° C., there are obtained 1.430 grams of copolymer having a glass transition temperature of −72° C.

EXAMPLE 22

The operation is the same as for Example 20, with 0.410 gram of pentyl-5 bicyclo [2.2.1] heptene-2 and 0.697 gram of diester of butyl ether of triethylene-glycol of the exo cis bicyclo [2.2.1] heptene-2 dicarboxylic-5,6 acid in solution in 2.5 ml. of toluene with 3 mg. of ruthenium chloride in 0.5 ml. butanol. In 24 hours there is obtained 0.850 gram of copolymer having a glass transition temperature of −70° C.

It will of course be understood that the present invention has only been described by way of explanation and not in any restrictive sense and that any useful modification can be made thereto without thereby departing from its scope.

We claim:
1. Elastomer polymers or polymers which can be used as bases for elastomer compositions, of the bicyclo [2.2.1] heptene-2 series, constituted by units having the formula:

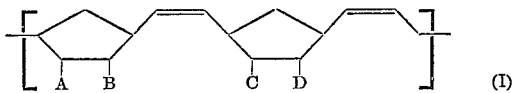

in which A represents H, B is selected from the group comprising the alkyl radicals with straight chain and branched chain with 2 to 14 atoms of carbon in the main chain, the alkoxy radicals with straight chain and branched chain comprising 2 to 14 atoms of carbon in the main chain; C is selected from the group comprising H, $CH_3$, $CO_2R$ (R being selected from the group comprising the alkyl and oxy-alkyl radicals with 2 to 14 atoms of carbon in the main chain, said main chain being selected from the group comprising straight chains and branched chains with the exclusion of chains having a branch in alpha with respect to the carboxyl carbon); D is selected from the group comprising H, $CO_2R$ as defined above, the alkyl radicals with straight chain and branched chain having 2 to 14 atoms of carbon in the main chain, the alkoxy radicals with straight chain and branched chain having 2 to 14 atoms of carbon in the main chain, provided that when D is selected from the group comprising the alkyl and alkoxy radicals having the above meaning, C represents hydrogen.

2. Polymers as claimed in claim 1, having a glass transition temperature lower than about −10° C.

3. Homopolymers of the alkyl-5 bicyclo [2.2.1] heptene-2 of Formula I in which A and C represent hydrogen and B and D are selected from the alkyl radicals with straight chain and branched chain with 2 to 14 atoms of carbon in the main chain.

4. Homopolymers of the alkoxy-5-bicyclo[2.2.1] heptene-2 of Formula I, in which A and C represent hydrogen and B and D are selected from the alkoxy radicals with straight chain and with branched chain having 2 to 14 atoms of carbon in the main chain.

5. Copolymers of Formula I, in which A and C represent hydrogen and B and D, which are different, are selected from the group comprising hydrogen and the alkyl radicals with straight chain and with branched chain having 2 to 14 atoms of carbon in the main chain.

6. Copolymers of Formula I, in which A represents hydrogen, B is selected from the group comprising the alkyl radicals with straight chain and with branched chain having 2 to 14 atoms of carbon in the main chain, C and D being selected from the group comprising $CO_2R$ having the meaning specified above.

7. A polymer in accordance with claim 1 having a glass transition temperature of no greater than 40° C.

8. A polymer in accordance with claim 3 wherein said alkyl radicals are linear and contain 5–10 carbon atoms.

References Cited

UNITED STATES PATENTS 3,330,815 7/1967 McKeon et al. _____ 260—93.1
3,367,924 2/1968 Rinehart _____ 260—89.3

JOSEPH L. SCHOFER, Primary Examiner
J. KIGHT, III, Assistant Examiner

U.S. Cl. X.R.
260—85.7, 86.1, 89.1, 89.3, 93.1; 252—429, 472